US010469683B2

(12) United States Patent
Namba

(10) Patent No.: US 10,469,683 B2
(45) Date of Patent: Nov. 5, 2019

(54) PANEL APPARATUS AND IMAGE RECORDING APPARATUS

(71) Applicant: BROTHER KOGYO KABUSHIKI KAISHA, Nagoya-shi, Aichi-ken (JP)

(72) Inventor: Mamoru Namba, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/711,870

(22) Filed: Sep. 21, 2017

(65) Prior Publication Data

US 2018/0097948 A1    Apr. 5, 2018

(30) Foreign Application Priority Data

Sep. 30, 2016 (JP) ................... 2016-192488

(51) Int. Cl.
| | | |
|---|---|---|
| *H04N 1/00* | (2006.01) | |
| *G03G 15/00* | (2006.01) | |
| *B41J 29/13* | (2006.01) | |
| *G03G 21/16* | (2006.01) | |
| *B41J 29/02* | (2006.01) | |

(52) U.S. Cl.
CPC .......... *H04N 1/00496* (2013.01); *B41J 29/02* (2013.01); *B41J 29/13* (2013.01); *G03G 15/5016* (2013.01); *G03G 21/1633* (2013.01); *H04N 1/00411* (2013.01); *H04N 1/00557* (2013.01); *G03G 2221/169* (2013.01); *G03G 2221/1687* (2013.01); *H04N 2201/0094* (2013.01)

(58) Field of Classification Search
CPC .......... H04N 1/00411; H04N 1/00496; G03G 15/502; G03G 15/5016
See application file for complete search history.

(56) References Cited

U.S. PATENT DOCUMENTS

2013/0077114 A1*  3/2013  Short ................. G03G 15/5016
                                                                  358/1.13

FOREIGN PATENT DOCUMENTS

| JP | 2007-334157 A | 12/2007 |
|---|---|---|
| JP | 2008-6625 A | 1/2008 |
| JP | 2010-109458 A | 5/2010 |
| JP | 2011-135541 A | 7/2011 |

* cited by examiner

*Primary Examiner* — David M. Gray
*Assistant Examiner* — Andrew V Do
(74) *Attorney, Agent, or Firm* — Merchant & Gould P.C.

(57) ABSTRACT

A panel apparatus includes: a body having an interior space open to an outside of the panel apparatus via an opening; one of a protrusion and a recess in the interior space; an input panel having a first surface, a second surface behind the first surface, and an input part provided in the first surface; a support part provided in the body to support the input panel such that the input panel pivots relative to the body; an arm protruding from the second surface and configured to guide the input panel such that the input panel pivots relative to the body by being inserted into the interior space through the opening; and the other of the protrusion and the recess which is provided in a part of the arm inserted into the interior space. Pivoting of the input panel is regulated by engagement of the protrusion and the recess.

11 Claims, 14 Drawing Sheets

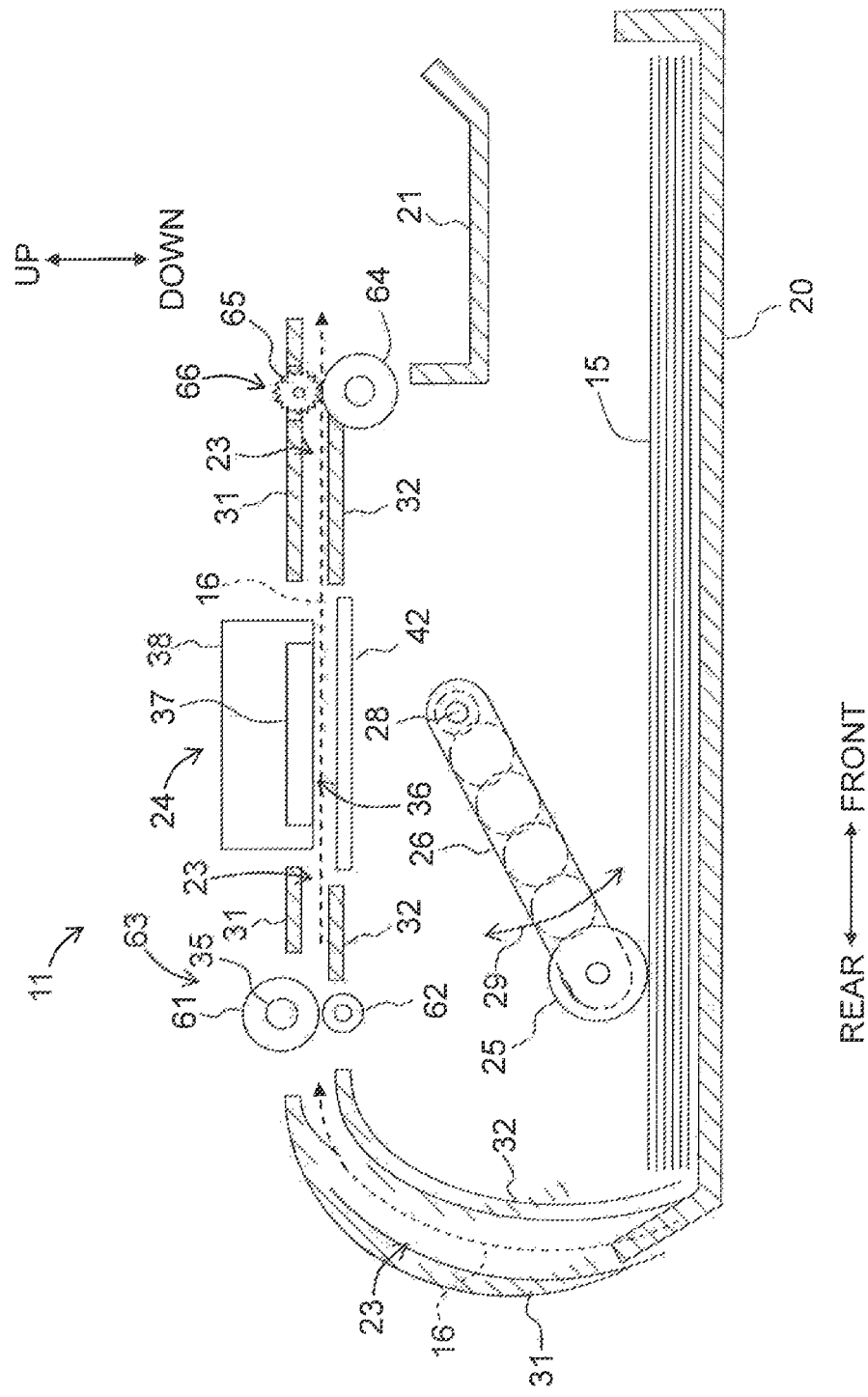

PANEL APPARATUS AND IMAGE RECORDING APPARATUS

CROSS REFERENCE TO RELATED APPLICATION

The present application claims priority from Japanese Patent Application No. 2016-192488 filed on Sep. 30, 2016, the disclosure of which is incorporated herein by reference in its entirety.

BACKGROUND

Field of the Invention

The present invention relates to a panel apparatus including an input part that receives an input operation and the like and an image recording apparatus including the panel apparatus.

Description of the Related Art

There is known, for example, an image recording apparatus including an operation panel that can be inclined to help a user perform an input operation on the operation panel (Japanese Patent Application Laid-open No. 2007-334157). In such an image recording apparatus, the operation panel is pivotally installed to a body of the image recording apparatus around, for example, a horizontal shaft. Further, the operation panel is configured to be fixed to the body of the image recording apparatus at a desired angle.

SUMMARY

The image recording apparatus may be used outdoors. The outdoors has more dust than indoor places, and thus the dust may accumulate on a pivoting mechanism of the operation panel to obstruct an operation of the pivoting mechanism. Further, although the operation panel is desired to pivot smoothly, the operation panel in a fixed state is required not to move or incline during the input operation thereto.

The present teaching has been made in view of the above circumstances, and an object of the present teaching is to provide, in a configuration pivotally supporting a panel with an input part, a means insusceptible to dust.

According to an aspect of the present teaching, there is provided a panel apparatus, including:

a body having an interior space which is open to an outside of the panel apparatus via an opening;

one of a protrusion and a recess in the interior space;

an input panel having a first surface, a second surface behind the first surface, and an input part provided in the first surface, a support part provided in the body and configured to support the input panel such that the input panel pivots relative to the body;

an arm protruding from the second surface and configured to guide the input panel such that the input panel pivots relative to the body, by being inserted into the interior space, through the opening; and the other of the protrusion and the recess which is provided in a part of the arm inserted into the interior space, wherein pivoting of the input panel is regulated by engagement of the protrusion and the recess.

Since the protrusion engages with the recess in the interior space of the body, dust in the outdoors and so on is prevented from accumulating on the engagement portion.

BRIEF DESCRIPTION OF THE DRAWINGS

FIG. 2 is a vertical cross-sectional view schematically depicting an interior structure of the printer unit.

DESCRIPTION OF THE EMBODIMENTS

An embodiment of the present teaching will be described below with reference to the drawings as appropriate. Note that, the embodiment described below is merely an example of the present teaching; it goes without saying that it is possible to make any appropriate change(s) in the embodiment of the present teaching without departing from the gist and/or scope of the present teaching. In the following explanation, an up-down direction is defined on the basis of the state in which a multifunction peripheral 10 is placed to be usable (the state depicted in FIGS. 1A and 1B). A front-rear direction is defined as a surface (a front surface 41) formed with an opening 13 is provided on the near side. A left-right direction is defined as the multifunction peripheral 10 is seen from the near side. Further, in the following explanation of each component of the multifunction peripheral 10, the up-down direction, the front-rear direction, and the left-right direction are defined on the basis of the state in which each component is installed to the multifunction peripheral 10. Furthermore, in the following explanation of an input panel 70 that is a movable member, the up-down direction, the front-rear direction, and the left-right direction are defined on the basis of a minimum inclined position depicted in FIG. 1A.

<Overall Configuration of Multifunction Peripheral 10>

Figure 1A:
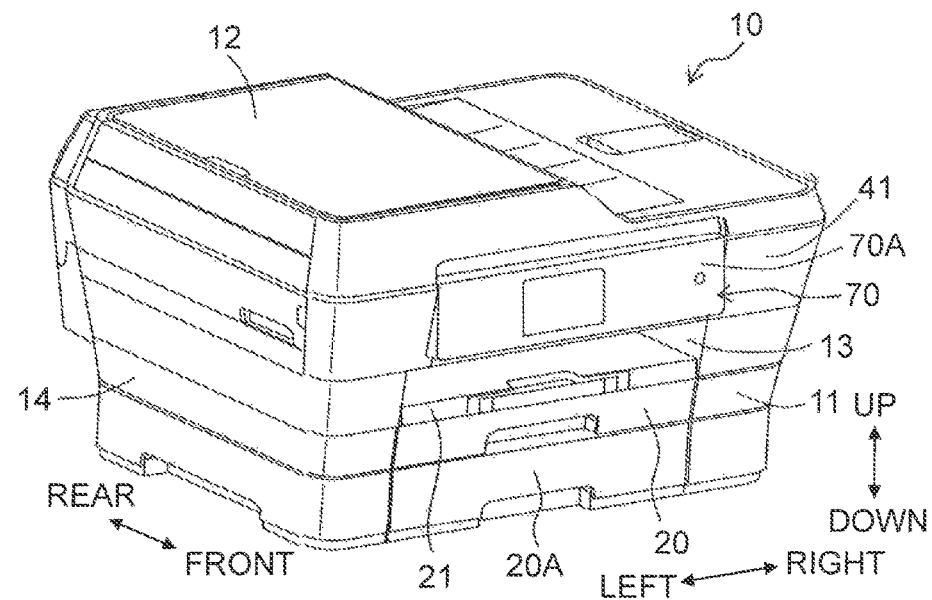
FIGS. 1A and 1B are perspective views of a multifunction peripheral including a printer unit as a panel apparatus according to an embodiment of the present teaching, FIG. 1A depicting a state in which an input panel is in a minimum inclined position, FIG. 1B depicting a state in which the input panel is in a maximum inclined position.
Figure 1B:
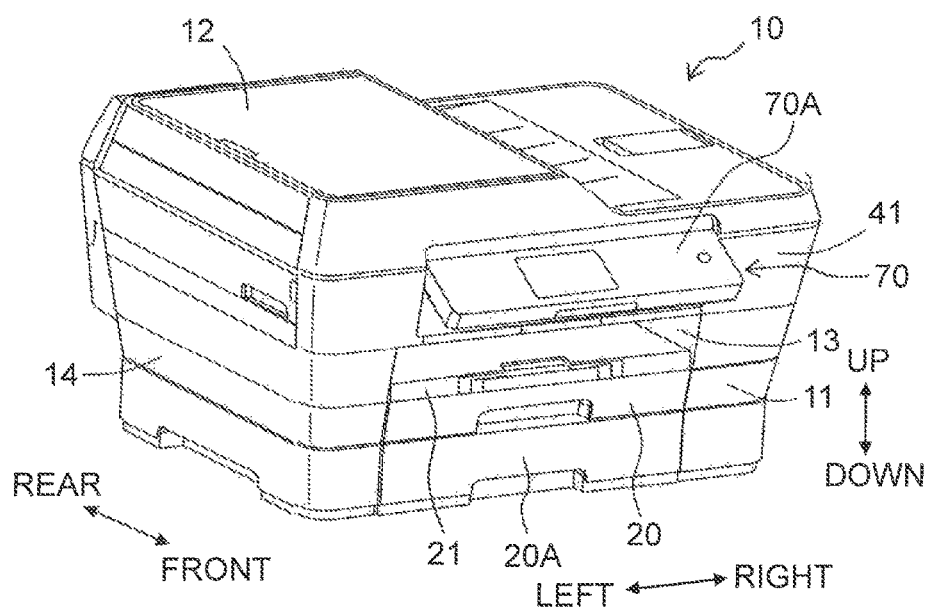

As depicted in FIGS. 1A and 1B, the multifunction peripheral 10 (an exemplary panel apparatus) has a substantially rectangular parallelepiped shape. An upper portion of the multifunction peripheral 10 is provided with a scanner unit 12 that reads an image recorded on a document, such as a recording sheet, with an image sensor to obtain image data. A lower portion of the multifunction peripheral 10 is provided with a printer unit 11 that records an image onto a recording sheet 15 (an exemplary sheet, see FIG. 2) on the basis of the image data or the like. An upper portion of the front surface 41 of the printer unit 11 is provided with the input panel 70, which is an operation input means of the multifunction peripheral 10.

<Scanner Unit 12>

The scanner unit 12 is configured as a so-called flatbed scanner. The detailed explanation for interior configuration of the scanner unit 12 will be omitted here.

<Printer Unit 11>

The printer unit 11, which has a substantially rectangular parallelepiped shape, includes a printer casing 14 (an exemplary body) of which front surface is formed with the opening 13.

<Feed Tray 20, Lower Feed Tray 20A>

As depicted in FIG. 2, a feed tray 20, a conveyance roller pair 63, a discharge roller pair 66, a recording unit 24, and the like are provided in the printer casing 14 of the printer unit 11. The feed tray 20 can be inserted into or removed from the printer casing 14 in the front-rear direction through the opening 13. The recording sheets 15 are stored in the feed tray 20. The conveyance roller pair 63 and the discharge roller pair 66 convey each recording sheet 15 stored in the feed tray 20 along a conveyance path 23. The recording unit 24 records an image on the recording sheet 15 conveyed through the conveyance path 23 based on image data read from a document by use of the scanner unit 12.

A feed roller 25 is provided above the feed tray 20 installed to the printer unit 11 and below the recording unit 24. The feed roller 25 is pivotally supported by a front end of a feed arm 26. The feed roller 25 rotates when receiving driving force transmitted from a feed motor (not depicted). The feed arm 26 pivots around a support shaft 28 provided at its base end in directions indicated by an arrow 29 in FIG. 2. This allows the feed roller 25 to make contact with or separate from the feed tray 20 or the recording sheet 15 supported by the feed tray 20. Further, a lower feed tray 20A, which is provided below the feed tray 20, can be inserted into or removed from the printer casing 14 in the front-rear direction. Since the configuration of the lower feed tray 20A and the conveyance of the recording sheet 15 stored therein are the same as those of the feed tray 20, detailed explanation and illustration therefor will be omitted.

<Discharge Tray 21>

The recording sheet 15 having an image recorded thereon is discharged on a discharge tray 21 provided above the feed tray 20. The discharge tray 21 is disposed to overlap with a part of the feed tray 20 in the up-down direction and is inserted/removed integrally with the feed tray 20 into/from the printer casing 14 through the opening 13. The discharge tray 21, which configures a bottom surface of the opening 13, is positioned below the input panel 70 with the feed tray 20 inserted into the printer casing 14. That is, the recording sheet 15 having an image recorded thereon is discharged into the opening 13.

<Conveyance Path 23>

As depicted in FIG. 2, the conveyance path 23 extends from a rear end of the feed tray 20, makes a U-turn frontward while extending from the lower side to the upper side at the rear side of the printer unit 11, and extends straight to reach the discharge tray 21. A part of the conveyance path 23 is configured by a first guide member 31 and a second guide member 32 facing each other at a predefined interval. The recording sheet 15 is conveyed through the conveyance path 23 in a conveyance direction 16 indicated by dashed arrows in FIG. 2.

<Conveyance Roller Pair 63 and Discharge Roller Pair 66>

As depicted in FIG. 2, the conveyance path 23 is provided with the conveyance roller pair 63 at the upstream of the recording unit 24 in the conveyance direction 16, the conveyance roller pair 63 being configured by a conveyance roller 61 and a pinch roller 62. The pinch roller 62 is in contact with a roller surface of the conveyance roller 61 by being urged with an elastic member (not depicted) such as a spring. The conveyance path 23 is provided with the discharge roller pair 66 at the downstream of the recording unit 24 in the conveyance direction 16, the discharge roller pair 66 being configured by a discharge roller 64 and a spur roller 65. The spur roller 65 is in contact with a roller surface of the discharge roller 64 by being urged with an elastic member (not depicted) such as a spring.

The conveyance roller 61 and the discharge roller 64 rotate when receiving driving force transmitted from a conveyance motor (not depicted). The conveyance roller 61 and the discharge roller 64 receiving the driving force convey the recording sheet 15 in the conveyance direction 16 while nipping the recording sheet 15 between the conveyance roller 61 and the pinch roller 62 and between the discharge roller 64 and the spur 65.

<Recording Unit 24>

As depicted in FIG. 2, the recording unit 24 is disposed above the conveyance path 23. A platen 42 is provided below the conveyance path 23 at a position facing the recording unit 24. An upper surface of the platen 42 supports the recording sheet 15 conveyed through the conveyance path 23. The recording unit 24 includes a recording head 37 at a position facing the conveyance path 23 and a carriage 38 carrying the recording head 37. The recording head 37 is formed with nozzles 36 from which ink supplied from each ink cartridge (not depicted) is jetted to the recording sheet 15 on the conveyance path 23. The carriage 38 reciprocates in the left-right direction 9. Ink droplets are jetted from the nozzles 36 to the recording sheet 15 conveyed through the conveyance path 23 while the carriage 38 reciprocates in the left-right direction 9. Accordingly, an image is recorded on the recording sheet 15.

In this embodiment, although the recording unit 24 records an image on the recording sheet 15 in accordance with an ink-jet recording system, the recording unit 24 may use any system such as an electrophotographic system.

<Controller>

A controller (not depicted), which is configured by a microcomputer and various electronic components, controls operations of the multifunction peripheral 10. The controller controls the conveyance motor to convey the recording sheet 15. The controller controls the recording unit 24 to record an image on the recording sheet 15. The controller is connected to the input panel 70 depicted in FIGS. 1A and 1B. Signals are inputted to the controller in response to input operations via an input unit (see FIG. 3) provided in a first surface 70A of the input panel 70.

<Input Panel 70>

Figure 3:
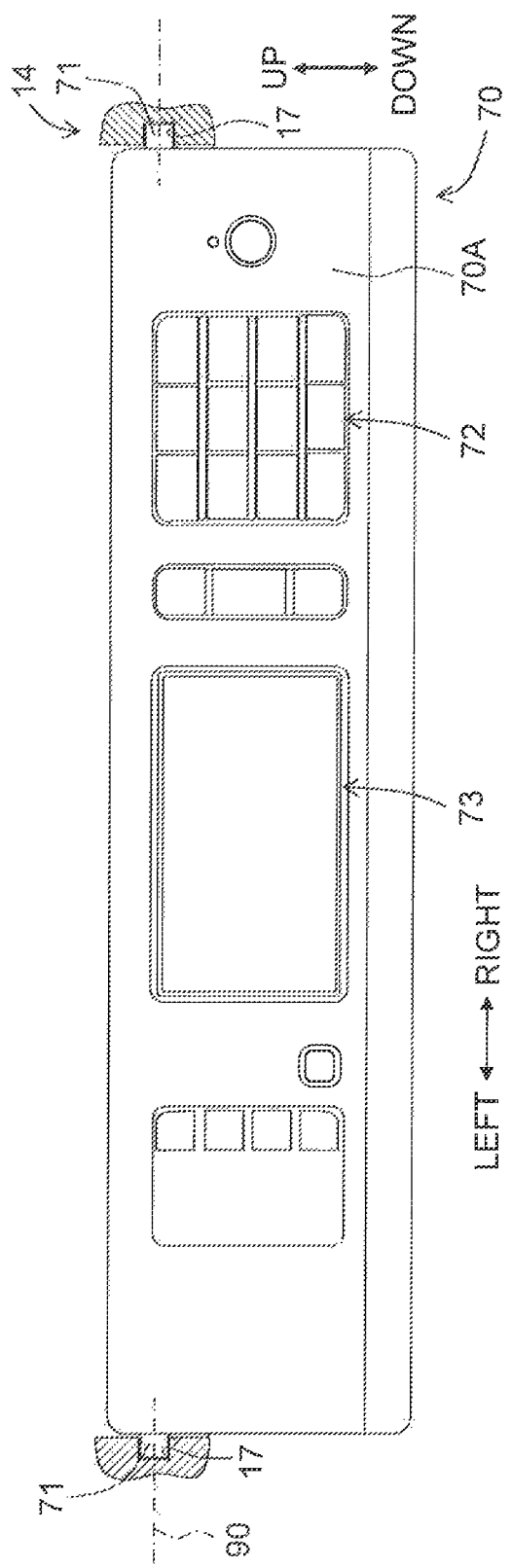
FIG. 3 is a front view of the input panel in the minimum inclined position.
Figure 4:
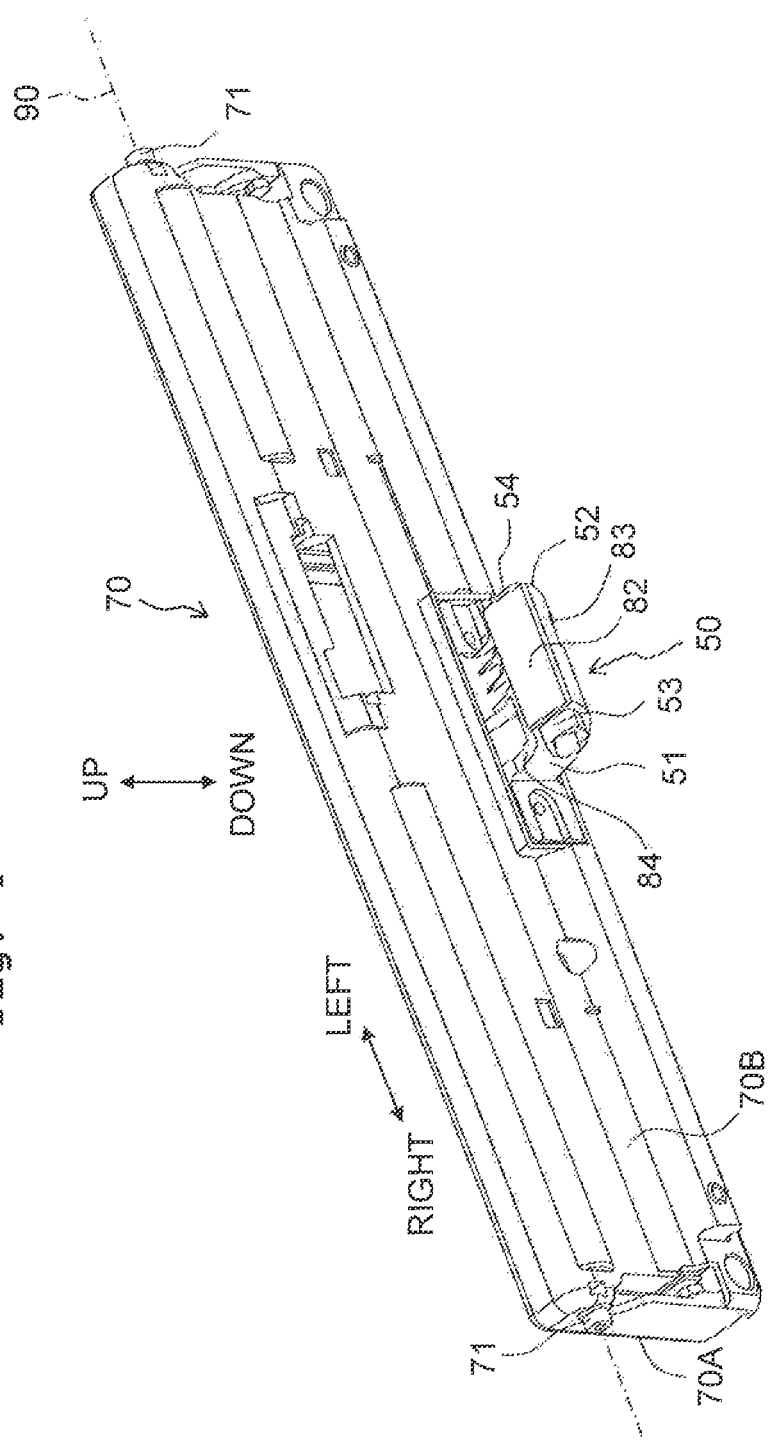
FIG. 4 is a perspective view of the input panel in the minimum inclined position when seen from an upper rear side.

As depicted in FIGS. 1A and 1B, the vicinity of an upper end of the input panel 70 is pivotally supported by a member configuring the front surface 41 of the printer casing 14. As depicted in FIGS. 3 and 4, upper portions of left and right ends of the input panel 70 are formed with pivot shafts 71 protruding therefrom and extending in the left-right direction. Namely, the pivot shafts 71 extend in the left-right direction. A member configuring the front surface 41 of the printer casing 14 is provided with support holes 17 (each of which is an exemplary support part) at positions facing the respective pivot shafts 71 of the input panel 70. Inserting the pivot shafts 71 into the support holes 17 pivotally supports the input panel 70 relative to the printer casing 14. The axes of the pivot shafts 71 coincide with a pivot axis 90 of the input panel 70 extending in the left-right direction (an exemplary predefined direction). This allows the input panel 70 to pivot around the pivot axis 90 positioned in the vicinity of the upper portion of the input panel 70. The input panel 70 has a substantially rectangular shape in which the length along the pivot axis 90 (the length in the left-right direction) is longer than the length in a direction perpendicular to the pivot axis 90 (e.g. the length in the up-down direction).

The input panel 70 can pivot around the pivot shafts 71 between a minimum inclined position depicted in FIG. 1A and a maximum inclined position depicted in FIG. 1B. In the minimum inclined position, a pivoting front end of the input panel 70 approaches the printer casing 14 most. The input panel 70 has the first surface 70A and a second surface 70B behind the first surface 70A. The first surface 70A faces the front side and the second surface 70B faces the rear side with the input panel 70 being in the minimum inclined position. The first surface 70A is substantially parallel to the second surface 70B. When the input panel 70 is in the minimum inclined position, the first surface 70A is along the up-down direction and left-right direction. In the maximum inclined position, the pivoting front end of the input panel 70 is separated from the printer casing 14 most. A lower end of the input panel 70 in the maximum inclined position is positioned at the upper front side of that of the input panel 70 in the minimum inclined position. Namely, the pivoting front end of the input panel 70 in the maximum inclined position is separated further from the printer casing 14 than the pivoting front end of the input panel 70 in the minimum inclined position.

<Operation Key Unit 72 and Touch Panel 73>

As depicted in FIG. 3, each of the operation key unit 72 and the touch panel 73 is provided, as an exemplary input part, in the first surface 70A of the input panel 70. In this embodiment, the first surface 70A of the input panel 70 is provided with the input parts (the operation key unit 72 and the touch panel 73) that are arranged in the left-right direction to receive input operations by a user. Here, the input part may be configured by the operation key unit 72 only or the touch panel 73 only. Although the input panel 70 of this embodiment includes the single operation key unit 72 and the single touch panel 73, the number of the operation key units 72 is not limited to one and the number of the touch panels 73 is not limited to one. Control circuit substrates (not depicted) are incorporated in the operation key unit 72 and the touch panel 73. The operation key unit 72 includes operation keys, and the control circuit substrate performs predefined processing in response to the pressing of each operation key.

The controller controls the touch panel 73 to display an instruction to the user, information relating to image recording, and the like. Namely, the touch panel 73 performs display processing for displaying an apparatus condition, image recording information, and the like by being controlled by the controller. The user presses the operation key unit 72 and/or touches an image displayed on the touch panel 73 based on the information displayed on the touch panel 73, thereby instructing the multifunction peripheral 10 to perform image recording. The operation key unit 72 and/or the touch panel 73 output(s) signal(s) to the controller in response to the pressing and/or the touch. Namely, the operation key unit 72 and the touch panel 73 perform operation processing for receiving the pressing and operation processing for receiving the touch, respectively. The recording unit 24 records an image based on the instruction from the controller. Namely, the recording unit 24 records an image on the recording sheet 15 in accordance with the operation performed by the user through the operation key unit 72 and/or the touch panel 73.

<Arm 50>

As depicted in FIG. 4, the second surface 70B of the input panel 70 is provided with an arm 50 at a substantially center portion in the left-right direction. The arm 50 protrudes from the second surface 70B. The arm 50 guides the input panel 70 such that the input panel 70 pivots relative to the printer casing 14.

Figure 5A:
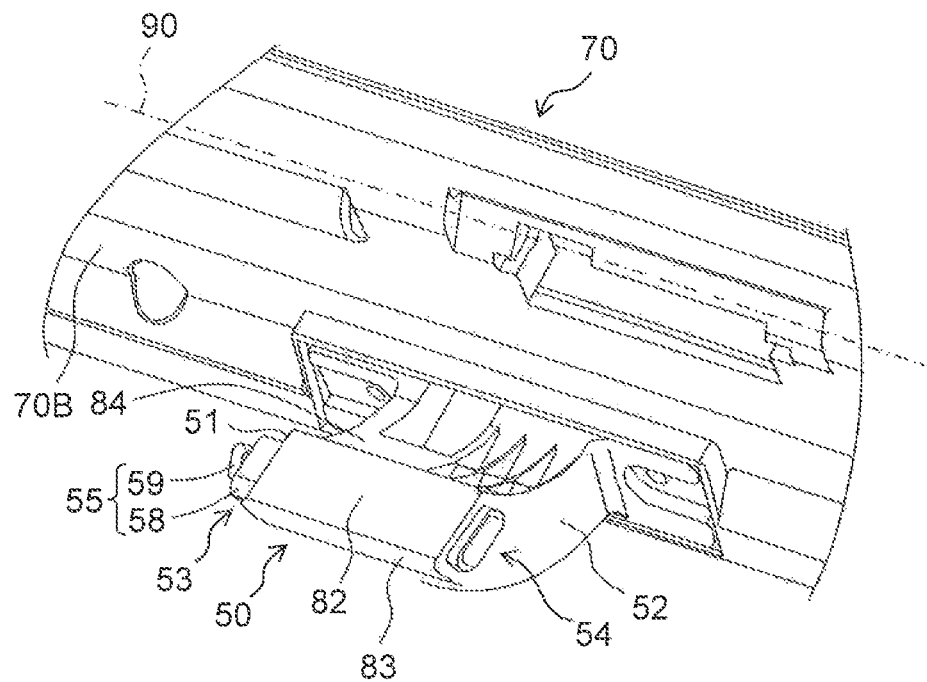
FIGS. 5A and 5B are perspective views of the input panel in the vicinity of an arm when seen from an upper rear side, FIG. 5A depicting a second side surface of the arm, FIG. 5B depicting a first side surface of the arm.
Figure 5B:
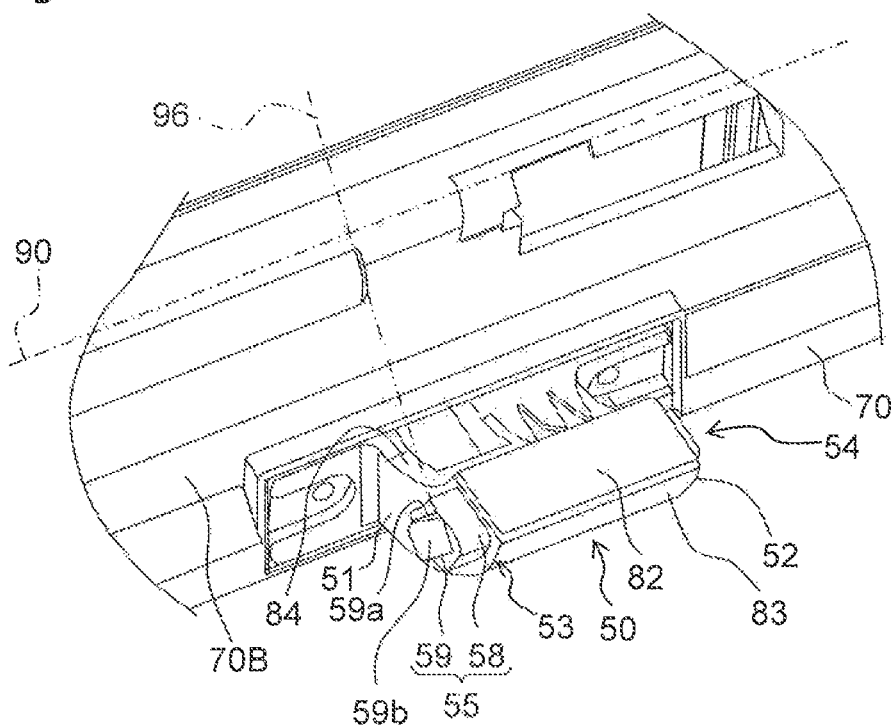

As depicted in FIGS. 4 to 5B, the arm 50 has a first side surface 51 (a right surface) and a second side surface 52 (a left surface) that are perpendicular to the second surface 70B. Each of the first side surface 51 and the second side surface 52 has an arc shape that is concentric with the pivot shafts 71 of the input panel 70. The arm 50 further has a rear end surface 82, an outer circumferential surface 83, and an inner circumferential surface 84. The rear end surface 82 connects an end of the first side surface 51 and an end of the second side surface 52. Each of the outer circumferential surface 83 and the inner circumferential surface 84 is an arc-like curved surface extending along the pivot axis 90. The outer circumferential surface 83 is farther from the pivot axis 90 than the inner circumferential surface 84.

As depicted in FIGS. 5A and 5B, a front end (an end farther from the second surface 70B) of the arm 50 is provided with a fitting plunger 53 and a friction plunger 54 that are involved in the regulation of pivoting of the input panel 70. As depicted in FIGS. 5A and 5B, the fitting plunger 53 is provided on the first side surface 51 of the arm 50. As depicted in FIG. 5A, the friction plunger 54 is provided on the second side surface 52 of the arm 50. Details of the fitting plunger 53 and the friction plunger 54 will be described later.

<Printer Casing 14>

Figure 6:
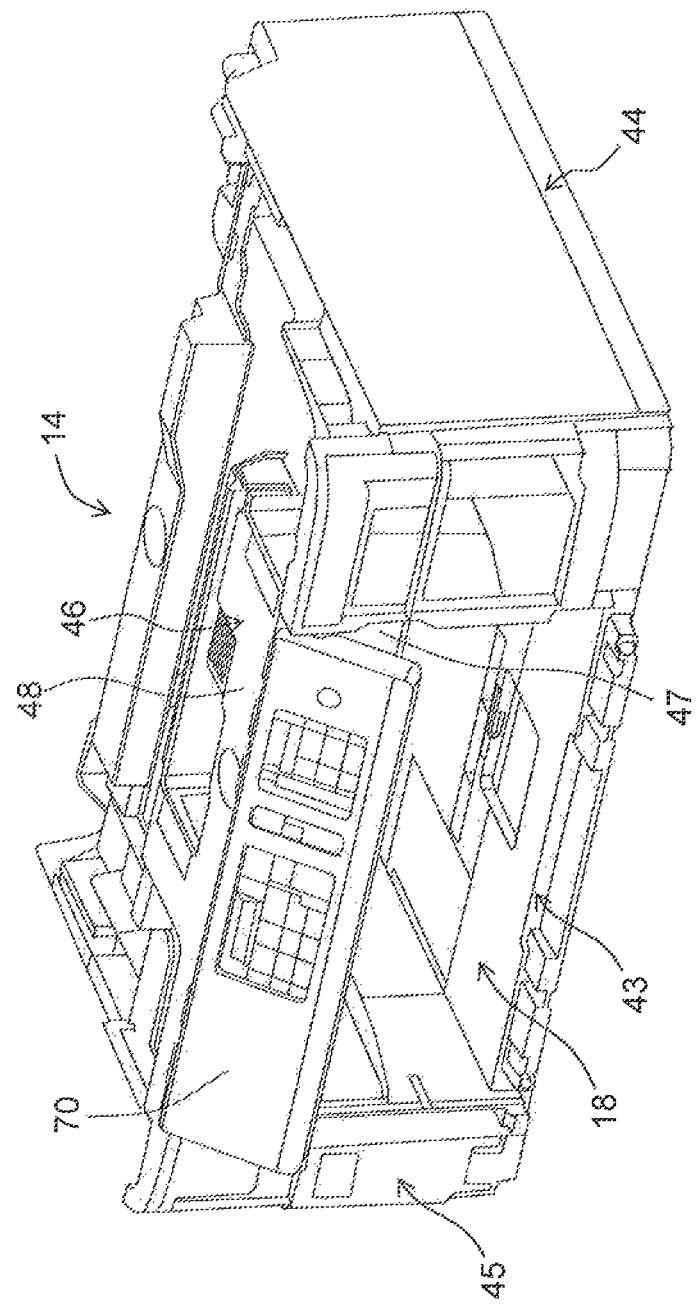
FIG. 6 is a perspective view of a printer casing.

As depicted in FIG. 6, the printer casing 14 includes a bottom part 43, a right case 44, a left case 45, and an upper case 46. The right case 44 and the left case 45 are disposed at the right and left sides of the bottom part 43. The upper case 46 is disposed to connect upper portions of the right case 44 and the left case 45. A conveyance mechanism of the recording sheet 15 and a device controlling the conveyance mechanism are stored inside the right case 44, the left case 45, and the upper case 46. The input panel 70 is disposed on the front side of the upper case 46. The scanner unit 12 depicted in FIG. 1 is disposed above the upper case 46. An opening 18 is configured by the bottom part 43, the right case 44, the left case 45, and the upper case 46 as depicted in FIG. 6. The discharge tray 21, the feed tray 20, and the lower feed tray 20A depicted in FIG. 1 are stored in the opening 18.

Figure 7:
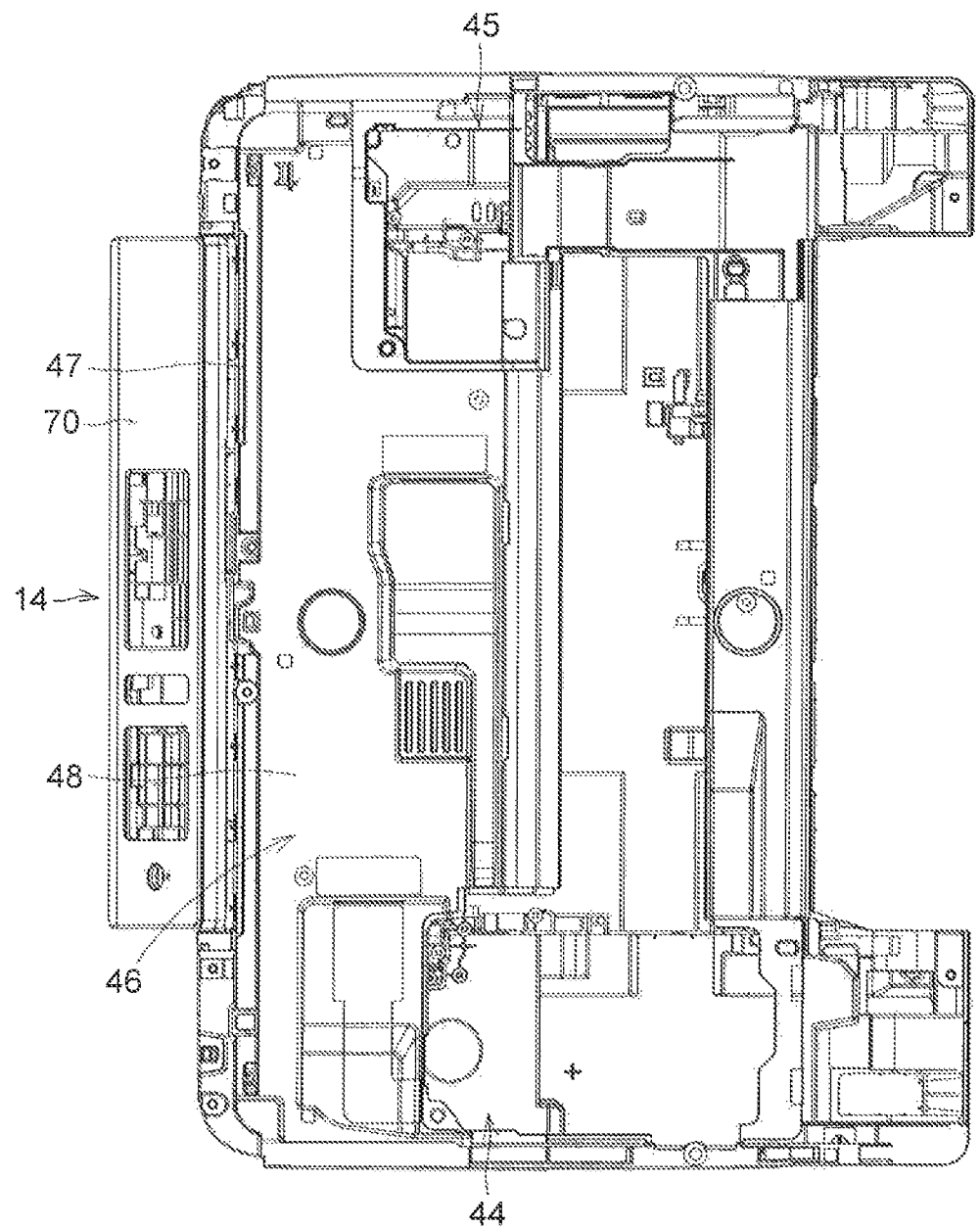
FIG. 7 is a top view of the printer casing.
Figure 8:
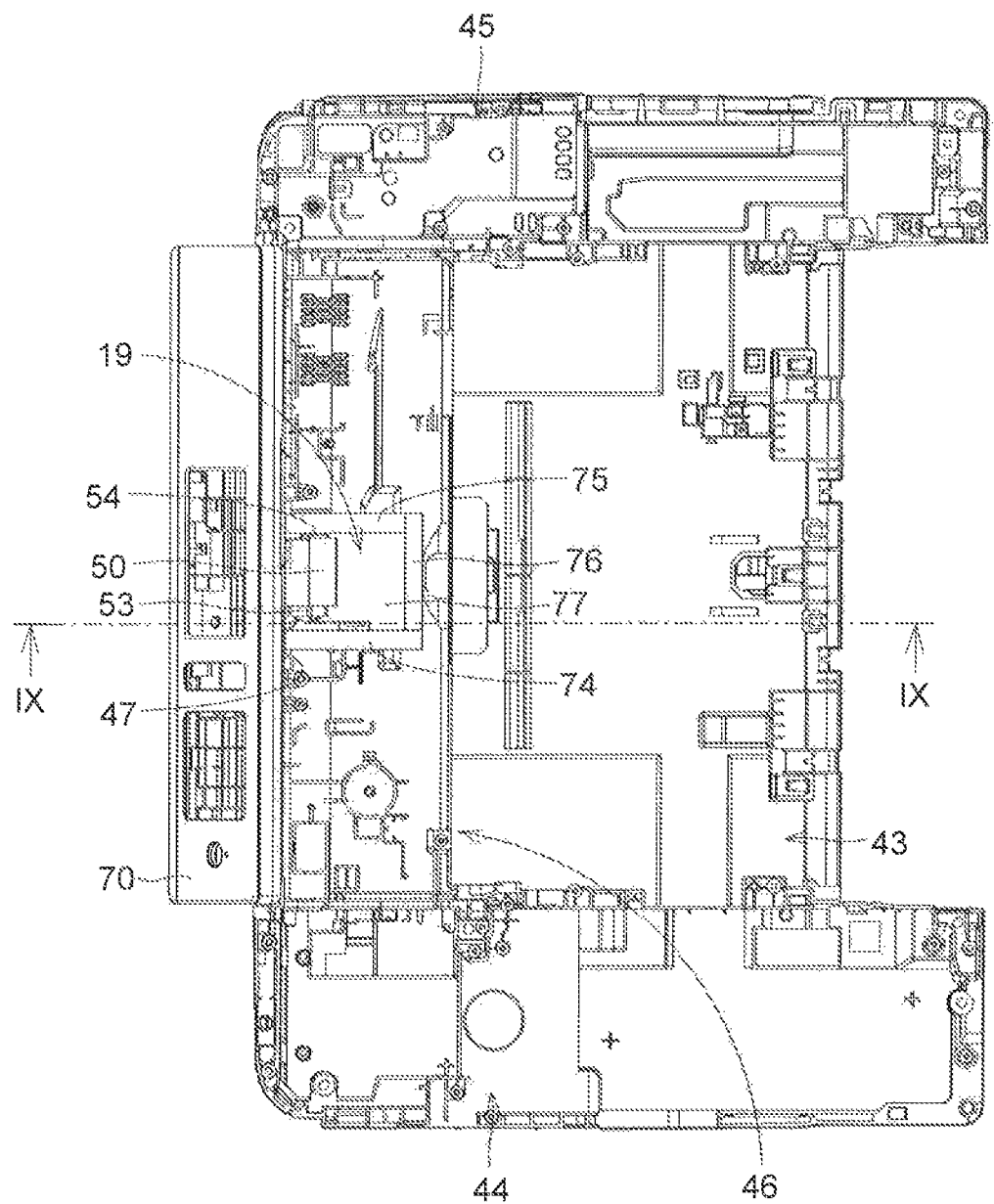
FIG. 8 is a top view of the printer casing from which an upper plate is removed.
Figure 9:
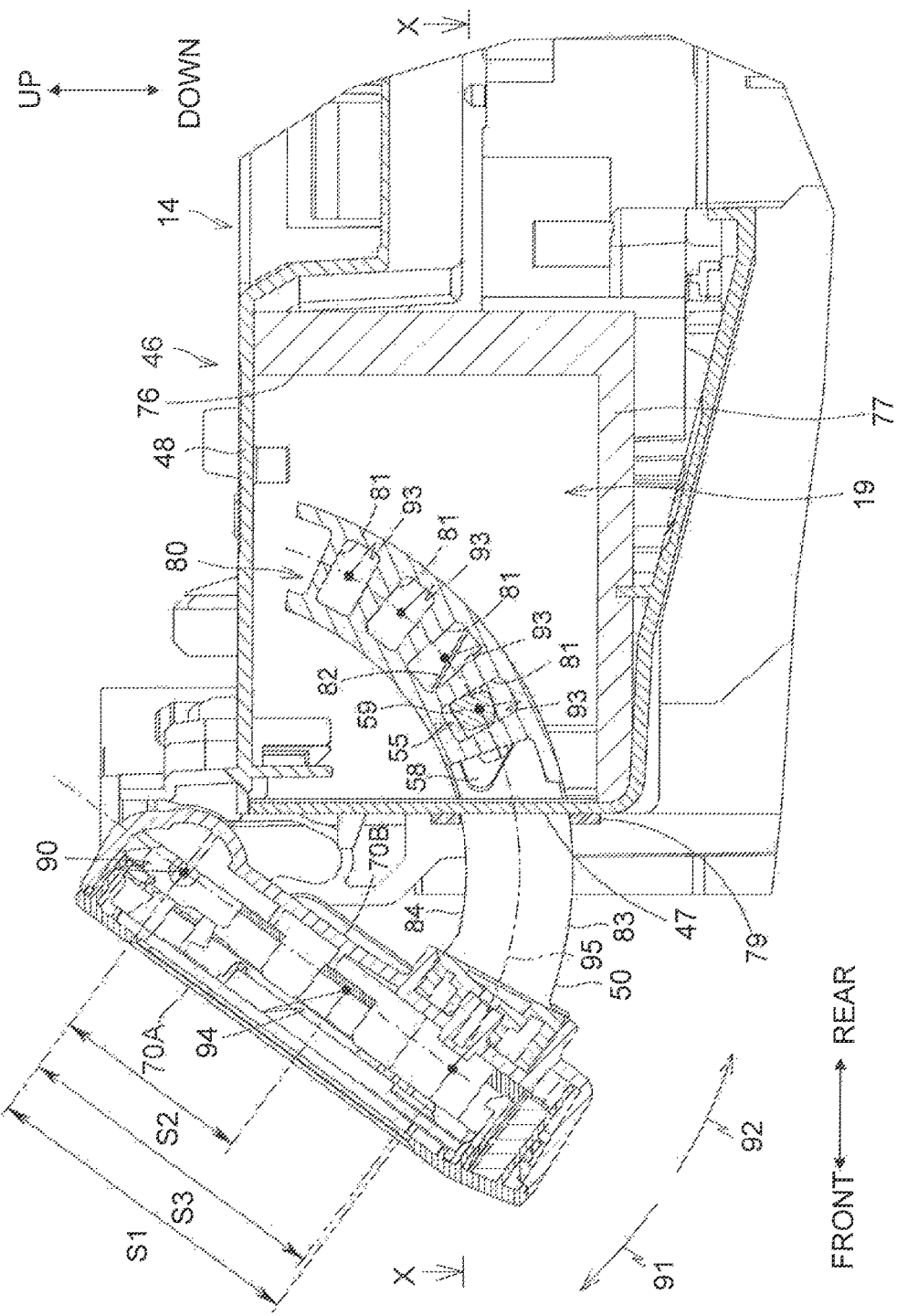
FIG. 9 is a cross-sectional view taken along a line IX-IX in FIG. 8.

As depicted in FIGS. 7 to 9, the upper case 46 includes a front plate 47 and an upper plate 48. As depicted in FIG. 8, the upper case 46 has an interior space 19 storing the arm 50. The upper case 46 includes a right wall 74, a left wall 75, a rear wall 76, and a lower wall 77 defining the interior space 19. The front plate 47, the upper plate 48, the right wall 74, the left wall 75, the rear wall 76, and the lower wall 77 (each of which is an exemplary wall defining the interior space 19) partition the inside of the printer casing 14 into the interior space 19 and another interior space different from the interior space 19.

Figure 10:
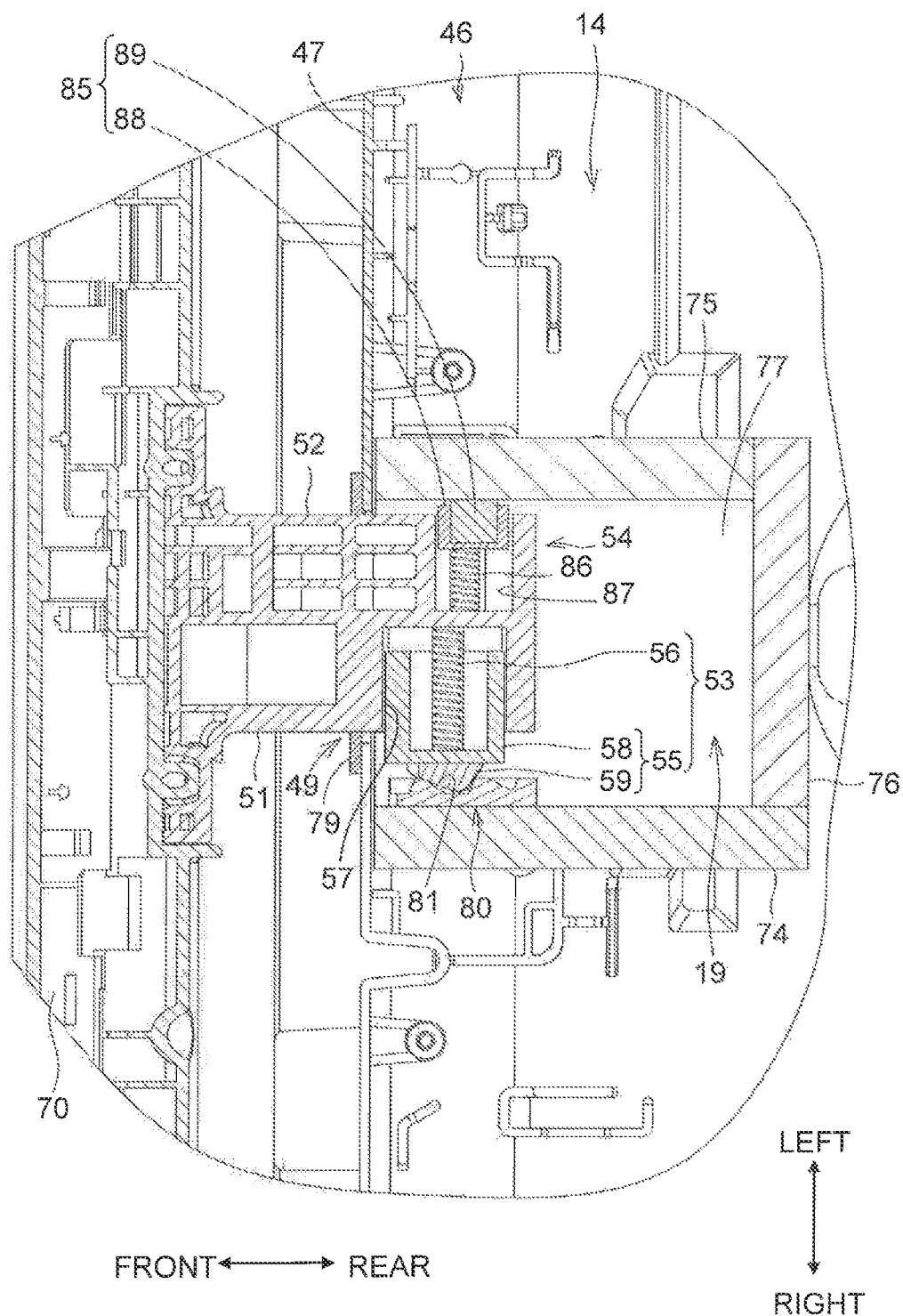
FIG. 10 is a cross-sectional view taken along a line X-X in FIG. 9.
Figure 11:
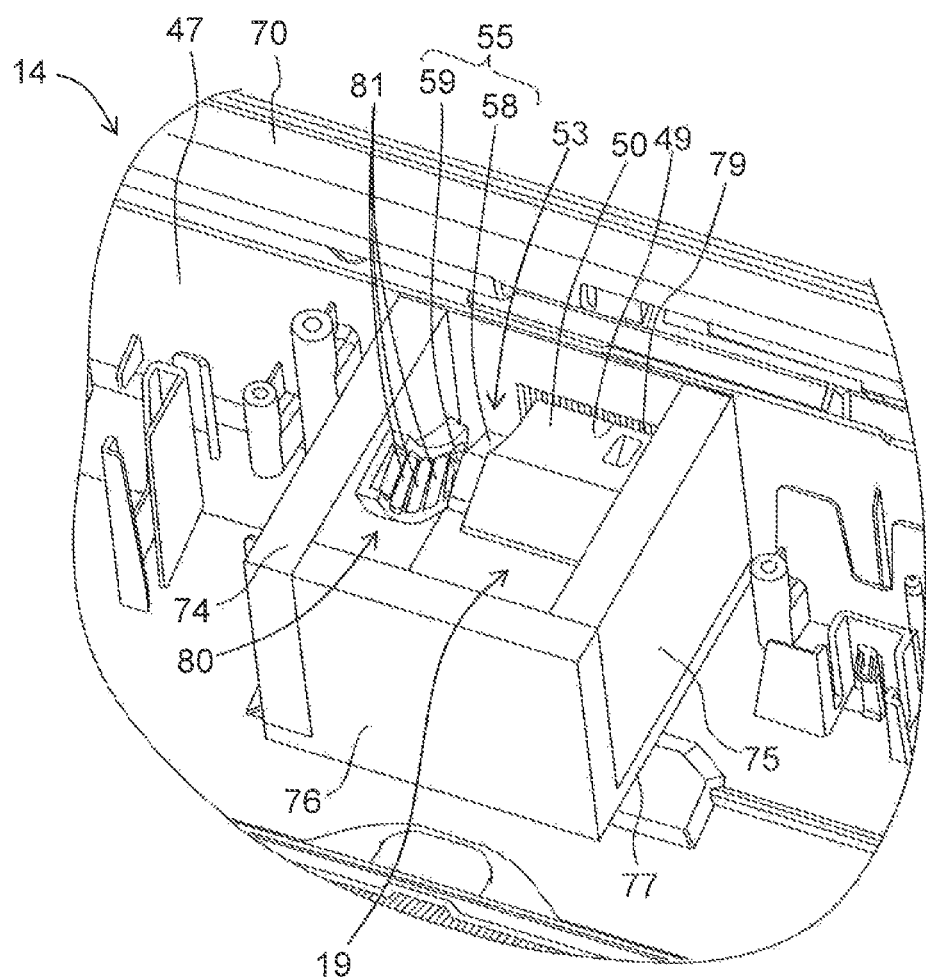
FIG. 11 is a perspective view of an inner part of an upper case when seen from an upper left side.
Figure 12:
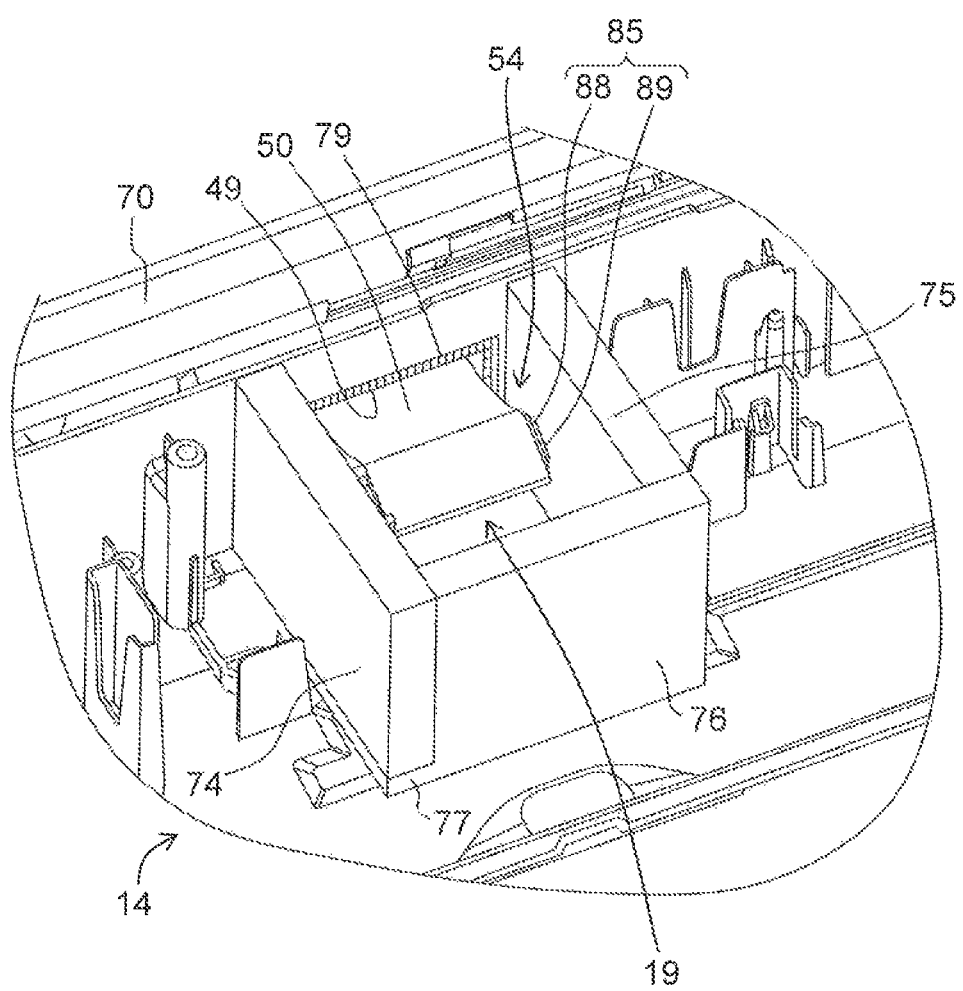
FIG. 12 is a perspective view of the inner part of the upper case when seen from an upper right side.

As depicted in FIGS. 10 to 12, the arm 50 is inserted into the interior space 19 through the opening 49 of the front plate 47. The interior space 19 communicates with the outside of the multifunction peripheral 10 via the opening 49.

<Fitting Plunger 53 and Fitting Plate 80>

As depicted in FIGS. 9 and 10, the printer casing 14 includes a fitting plate 80 that is involved in the regulation of pivoting of the input panel 70. The fitting plate 80 is disposed in the interior space 19 and fixed to the right wall 74. The fitting plate 80 has fitting holes 81. Fitting the fitting plunger 53 of the arm 50 into any of the fitting holes 81 of the fitting plate 80 regulates the pivoting of the input panel 70. The input panel 70 can pivot in a first pivoting direction 91 and a second pivoting direction 92. The first pivoting direction 91 is a direction in which the input panel 70 pivots from the second surface 70B side toward the first surface 70A side. The second pivoting direction 92 is a reverse direction of the first pivoting direction 91.

As depicted in FIG. 10, the fitting plunger 53 includes a fitting member 55 (an exemplary protrusion) and a compression spring 56 (an exemplary first urging member) that urges the fitting member 55 toward the fitting plate 80. The fitting member 55 includes a bottomed cylindrical part 58 and a fitting piece 59 fixed to the cylindrical part 58. The arm 50 has a recess 57 depressed leftward from the first side surface 51. A part of the cylindrical part 58 is disposed in the recess 57 and the compression spring 56 is disposed in the cylindrical part 58 and the recess 57. The cylindrical part 58 has a rectangular parallelopiped shape. An inner surface of the recess 57 is formed corresponding to an outer surface of the cylindrical part 58. The cylindrical part 58 is movable in a direction intersecting with the first side surface 51, for example, in the left-right direction. The fitting member 55 is urged rightward with the compression spring 56.

As depicted in FIG. 5B, the fitting piece 59 has a triangular prism shape extending along a straight line 96 orthogonal to the pivot axis 90. The fitting piece 59 has a front inclined surface 59a facing the front side and a rear inclined surface 59b facing the rear side. At the boundary between the front inclined surface 59a and the rear inclined surface 59b, the fitting piece 59 protrudes rightward most. The front inclined surface 59a and the rear inclined surface 59b are provided such that the fitting member 55 easily comes off the fitting plate 80 along with the pivoting of the input panel 70.

As depicted in FIGS. 9 to 11, the fitting plate 80, which is provided in the right wall 74 defining the interior space 19, is exposed to the interior space 19. When seen in the left-right direction, the fitting plate 80 is a plate-like member extending along an arc 95 of which center is the pivot axis 90 of the input panel 70. The fitting plate 80 has fitting holes 81 (each of which is an exemplary recess) arranged along the arc 95. Each of the fitting holes 81 is depressed rightward from a left surface 80a of the fitting plate 80. The fitting piece 59 of the fitting plunger 53 can go into each fitting hole 81. The fitting piece 59 is movable between a first position in which the fitting piece 59 is in the fitting hole 81 and a second position in which the fitting piece 59 retracted from the fitting hole 81 is on the arm 50 side. When the fitting piece 59 is in the first position, the fitting member 55 engages with one of the fitting holes 81 of the fitting plate 80. This regulates the pivoting of the input panel 70. Here, the fitting piece 59 of the fitting member 55 has the front inclined surface 59a and the rear inclined surface 59b. Thus, when external force causing the pivoting of the input panel 70 is applied to the input panel 70, the external force acts in a direction in which the fitting member 55 moves toward the arm 50 (leftward) against the urging force of the compression spring 56. When the external force withdraws the fitting member 55 from the fitting hole 81 and the fitting piece 59 reaches the second position, the fitting member 55 comes off the fitting plate 80. This allows the input panel 70 to pivot.

As depicted in FIG. 9, fitting positions 93 are aligned along the arc 95, and the fitting piece 59 fits into any of the fitting holes 81 at any of the fitting positions. Since the fitting piece 59 can fit into each of the fitting holes 81 at the corresponding one of the fitting positions 93, the input panel 70 can have each of the different inclined angles corresponding to one of the fitting positions 93.

As depicted in FIG. 9, a first vertical distance S1 between each fitting position 93 and the pivot axis 90 is longer than a second vertical distance S2 between a center position 94 of the input panel 70 in the direction orthogonal to the pivot axis 90 and the pivot axis 90, when seen in the left-right direction. When the fitting member 55 fits into any of the fitting holes 81 of the fitting plate 80, the input panel 70 is supported by the printer casing 14 at a position farther from the pivot axis 90 than the center position 94. This allows the input panel 70 to be stably supported.

As depicted in FIG. 9, a third vertical distance S3 indicates a distance between a part, of the input part of the input panel 70, closest to the pivoting front end (e.g., a lower end of the touch panel 73) and the pivot axis 90. The third vertical distance S3 is shorter than the first vertical distance S1. Thus, the user can perform the input operation easily and comfortably at the lower end of the touch panel 73.

<Friction Plunger 54>

As depicted in FIG. 10, the friction plunger 54 includes a moving member 85 and a compression spring 86 that urges the moving member 85 toward the left wall 75 (an exemplary second urging member). The moving member 85 includes a bottomed cylindrical holder 88 and a rubber member 89 (an exemplary elastic member) held by the holder 88. Here, the arm 50 includes a recess 87 depressed rightward from the second side surface 52. A part of the holder 88 is disposed in the recess 87, and the compression spring 86 is disposed in a space defined by a bottom of the holder 88 and the recess 87. An inner surface of the recess 87 is formed corresponding to an outer surface of the holder 88. The holder 88 is slidable in a direction intersecting with the second side surface 52, for example, in the left-right direction. The moving member 85 is urged leftward with the compression spring 86.

The rubber member 89 is made from, for example, rubber of which surface has a coating improving slidability (referred to as highly slidable rubber). The rubber member 89, which has a rectangular parallelopiped shape, is disposed such that its axis direction is perpendicular to the second side surface 52. Bringing the rubber member 89 as the elastic member into contact with the left wall 75 can prevent backlash or clatter during the pivoting of the input panel 70, thereby allowing the user to pivot the input panel 70 easily and comfortably.

<Arm Guide 60 and Positioning Groove 78>

Figure 13:
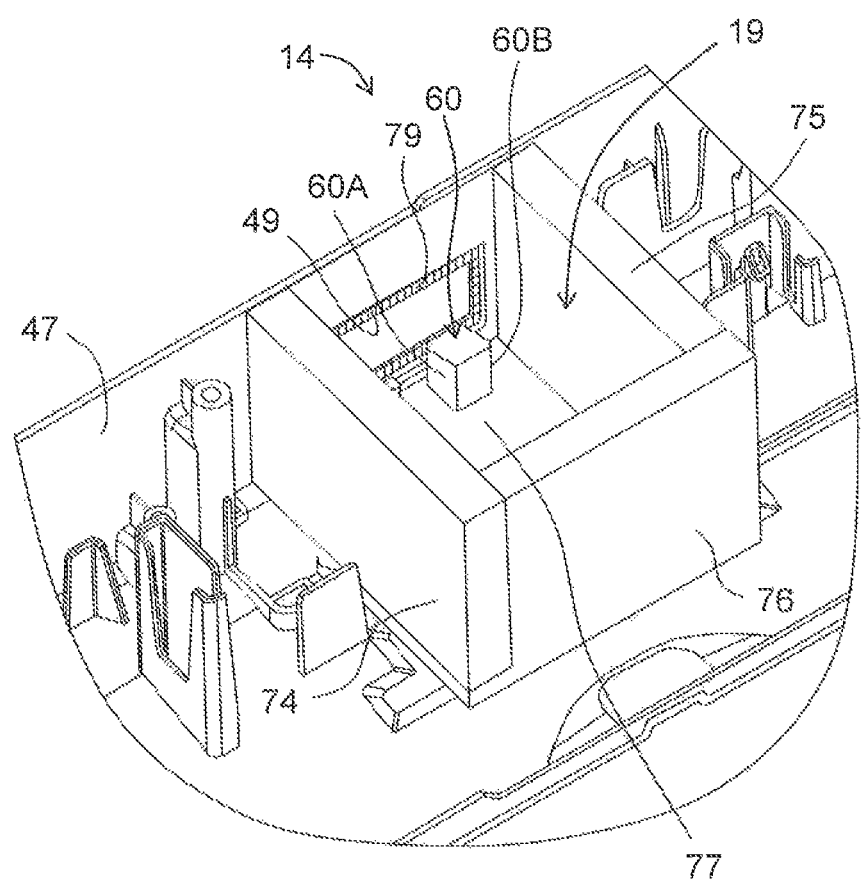
FIG. 13 is a perspective view of an interior space of the printer casing from which the arm is removed.

As depicted in FIG. 13, the interior space 19 of the multifunction peripheral 10 is provided with an arm guide 60 (an exemplary protrusion) guiding the pivoting of the arm

50. The arm guide 60, which is fixed to the lower wall 77, protrudes upward from the lower wall 77, that is toward the arm 50.

Figure 14:
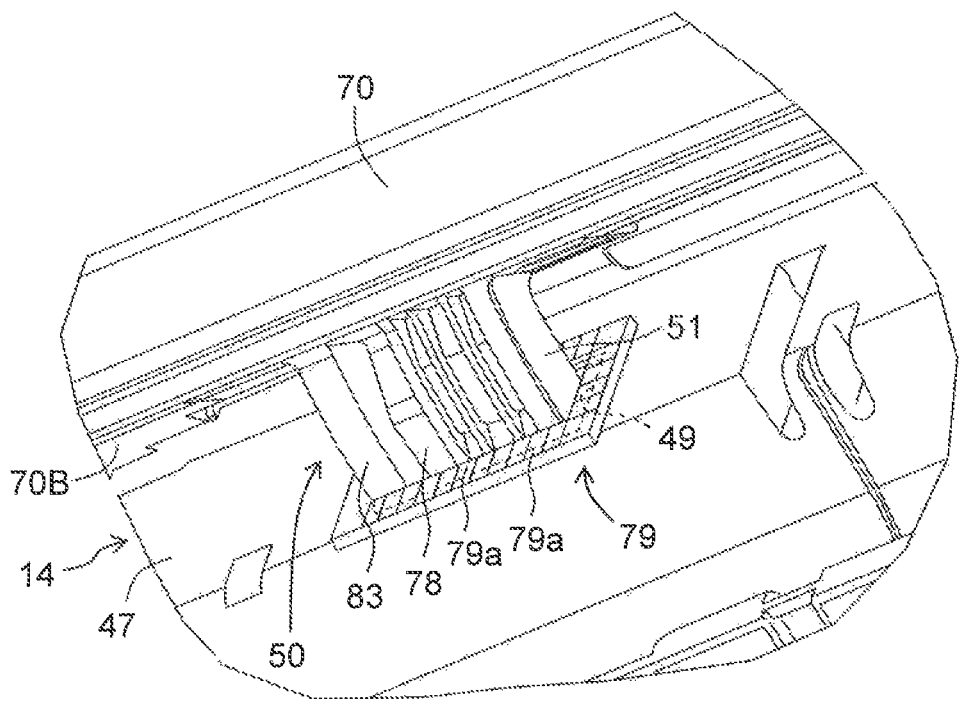
FIG. 14 is a perspective view of the printer casing in the vicinity of the arm when seen from a lower front side.

As depicted in FIG. 14, the outer circumferential surface 83 of the arm 50 is formed with the positioning groove 78 recessed toward the pivot axis 90. When seen in the left-right direction, the positioning groove 78 has an arc shape of which center is the pivot axis 90. A part of the arm guide 60 (an exemplary second protrusion) goes into the positioning groove 78 such that the arm guide 60 fits into the positioning groove 78. The distance between a left surface 60A of the arm guide 60 and a right surface 60B of the arm guide 60 is substantially equal to the distance between a left inner surface 78A of the positioning groove 78 and a right inner surface 78B of the positioning groove 78. This can prevent the pivot shafts 71 from deviating from the pivot axis 90 during the pivoting of the input panel 70. Further, it is possible to reduce variation in the positional relation between the fitting member 55 and each fitting hole 81 and variation in the positional relation between the rubber member 89 and the left wall 75. Especially, since variation in the friction force between the rubber member 89 and the left wall 75 is reduced, the user can pivot input panel 70 easily and comfortably.

<Dust-Proof Member 79>

As depicted in FIG. 14, the multifunction peripheral 10 includes a dust-proof member 79 that closes a gap between the arm 50 and the opening 49. The dust-proof member 79, which is fixed to the front plate 47, surrounds the opening 49. The dust-proof member 79 is, for example, an aggregate of rectangular rubber pieces 79a. The dust-proof member 79 is in contact with the outer circumferential surfaces of the arm 50, that is, the first side surface 51, the second side surface 52, the outer circumferential surface 83, and the inner circumferential surface 84, thereby closing the gap at all times. Along with the pivoting of the input panel 70, the first side surface 51, the second side surface 52, the outer circumferential surface 83, and the inner circumferential surface 84 of the arm 50 may slide on the dust-proof member 79.

Action and Effect of Embodiment

In the above embodiment, in the interior space 19 of the printer casing 14, the fitting member 55 fits into each fitting hole 81. Thus, the fitting portion is insusceptible to exterior dust.

The dust-proof member 79 prevents dust from entering the interior space 19 of the printer casing 14 through the gap between the arm 50 and the opening 49. Further, the dust adhering to the arm 50 is wiped off by sliding the arm 50 on the dustproof member 79 along with the pivoting of the input panel 70, thereby preventing the dust from entering the interior space 19 of the printer casing 14.

Since the interior space 19 is defined, as a closed space, by the front plate 47, the upper plate 48, the right wall 74, the left wall 75, the rear wall 76, and the lower wall 77, dust is prevented from entering another interior space of the printer casing 14 through the interior space 19.

Fitting the fitting member 55 into one of the fitting holes 81 can regulate the pivoting of the input panel 70 at an angle corresponding to the one of the fitting holes 81.

Bringing the rubber member 89 on the second side surface 52 into contact with the left wall 75 of the interior space 19 allows the user to pivot the input panel 70 easily and comfortably.

Since the first vertical distance 51 is longer than the second vertical distance S2, the fitting position 93 where the fitting member 55 is fitted into the fitting hole 81 is relatively close to the pivoting front end of the input panel 70. For example, compared with a case in which the fitting position 93 is adjacent to the pivot axis 90, the configuration of the embodiment can reduce the force required to maintain the state where the fitting member 55 is fitted into the fitting hole 81, thus supporting the input panel 70 stably.

Fitting the arm guide 60 into the positioning groove 78 stably defines the positional relation between the fitting member 55 and the fitting hole 81.

The third vertical distance S3 is shorter than the first vertical distance 51 in the embodiment. This can reduce any inconvenience, such as shaking and inclining of the input panel 70, which may otherwise be caused when the user presses or touches the operation key unit 72 or the touch panel 73. Thus, the force required to maintain the state in which the fitting member 55 is fitted into the fitting hole 81 can be reduced.

In the embodiment, when the user performs the input operation or the pivoting operation in the vicinity of an end in the direction along the pivot axis 90, a great degree of moment occurs to pivot the input panel 70 around the axis intersecting with the pivot axis 90. Even in such a case, the user can easily get a good operation feeling of the input operation or the pivoting operation.

Modified Embodiment

In the above embodiment, the fitting plate 80 formed with the fitting holes 81 is provided in the interior space 19 of the printer casing 14, and the fitting member 55 is provided in the arm 50. Instead of this configuration, the fitting plate 80 formed with the fitting holes 81 may be provided in the arm 50 and the fitting member 55 may be provided in the interior space 19. In such a configuration also, the pivoting range of the input panel 70 is regulated such that the fitting plate 80 of the arm 50 stays in the interior space 19 with the input panel 70 being in the maximum inclined position. Further, instead of the fitting member 55 and the fitting holes 81, a protrusion that can protrude or retract from a predefined surface may be provided in one of the arm 50 and the interior space 19, and a recess with which such a protrusion can engage may be provided in the other of the arm 50 and the interior space 19.

In the above embodiment, the fitting member 55 is urged toward the fitting hole 81 with the compression spring 56. The present teaching is not limited thereto. The fitting member 55 may be configured by a deformable elastic member without using the compression spring 56. In that case, the elastic member is fitted into the fitting hole 81 under normal conditions. When external force pivoting the input panel 70 is applied, the elastic member contracts and comes off the fitting hole 81.

In the above embodiment, the dust-proof member 79 is the aggregate of the rectangular rubber pieces 79a. The present teaching, however, is not limited thereto. The dust-proof member 79 may be a member, such as a brush, on which the arm 50 is slidable.

In the above embodiment, the arm guide 60 as a protrusion is provided in the interior space 19 and the positioning groove 78 as a recess into which the protrusion fits is provided in the arm 50, as the configuration guiding the pivoting of the arm 50. Instead of this configuration, a protrusion may be provided in the arm 50 and a groove into which the protrusion fits may be provided in the interior space 19.

In the above embodiment, the input panel 70 is pivotally supported by inserting the pivot shafts 71 of the input panel 70 into the support holes 17 of the printer casing 14. The present teaching, however, is not limited thereto. The input panel 70 may be pivotally supported by inserting pivot shafts of the printing casing 14 into support holes of the input panel 70. In that case, each of the pivot shafts of the printer casing 14 is an exemplary support part.

In the above embodiment, the multifunction peripheral 10 as an exemplary panel apparatus includes the printer unit 11 and the scanner unit 12. The panel apparatus, however, is not limited to the above configuration and may be any apparatus including the input panel 70 and a body that pivotally supports the input panel 70. The panel apparatus may be a printer including the input panel 70 and the printer unit 11 supporting the input panel 70 or a scanner including the input panel 70 and the scanner unit 12 supporting the input panel 70.

What is claimed is:

1. A panel apparatus, comprising:
   a body having an interior space which is open to an outside of the panel apparatus via an opening;
   one of a protrusion and a recess provided in the interior space of the body;
   an input panel having a first surface, a second surface behind the first surface, and an input part provided in the first surface,
   a support part provided in the body and configured to support the input panel such that the input panel pivots relative to the body;
   an arm protruding from the second surface and configured to guide the input panel, by being inserted into the interior space of the body through the opening, such that the input panel pivots relative to the body;
   the other of the protrusion and the recess which is provided in the arm,
   wherein pivoting of the input panel is regulated by engagement of the protrusion and the recess, and
   during the pivoting of the input panel, the other of the protrusion and the recess provided in the arm stays in the interior space of the body without being exposed to the outside of the body.

2. The panel apparatus according to claim 1, further comprising a dust-proof member surrounding the opening to close a gap between the arm and the opening.

3. The panel apparatus according to claim 1, further comprising a wall partitioning an interior of the body into the interior space and another interior space different from the interior space.

4. The panel apparatus according to claim 3, further comprising a first urging member configured to urge the protrusion toward the recess,
   wherein the protrusion is movable between a first position where the protrusion engages with the recess and a second position where the protrusion is separated from the recess.

5. The panel apparatus according to claim 4,
   wherein the input panel is supported by the support part to pivot around a pivot axis extending in a predefined direction, and
   the recess is included in recesses arranged along an arc, the arc having the pivot axis of the input panel as a center when seen in the predefined direction.

6. The panel apparatus according to claim 5,
   wherein the arm has a first side surface and a second side surface which are orthogonal to the second surface of the input panel,
   the protrusion is disposed on the first side surface,
   the second side surface is provided with a moving member that is movable in a direction orthogonal to the second side surface and a second urging member configured to urge the moving member toward the wall, and
   the moving member includes a holder configured to slide relative to the arm in the direction orthogonal to the second side surface and an elastic member held by the holder and being in contact with the wall.

7. The panel apparatus according to claim 5, wherein, when seen in the predefined direction, a first vertical distance between an engaging position where the protrusion engages with the recess and the pivot axis is longer than a second vertical distance between a center position of the input panel in a direction orthogonal to the pivot axis and the pivot axis.

8. The panel apparatus according to claim 7,
   wherein the input part is configured to receive an input operation by a user, and
   when seen in the predefined direction, a third vertical distance between a part of the input part which is closest to a pivoting front end of the input panel and the pivot axis of the input panel is equal to or shorter than the first vertical distance.

9. The panel apparatus according to claim 5, further comprising:
   a groove provided in one of the body and the arm and extending to have an arc shape with the pivot axis as a center when seen in the predefined direction; and
   a second protrusion provided in the other of the body and the arm and configured to be fitted into the groove.

10. The panel apparatus according to claim 5, wherein the input panel has a size in the predefined direction which is longer than a size in a direction orthogonal to the predefined direction.

11. An image recording apparatus, comprising:
    the panel apparatus as defined in claim 1; and
    a recording unit provided in the body and configured to record an image on a sheet.

* * * * *